United States Patent [19]

Su

[11] Patent Number: 4,617,363
[45] Date of Patent: Oct. 14, 1986

[54] ω-PERFLUOROALKYL-α-OLEFIN POLYMERS

[75] Inventor: Aaron C. L. Su, Wilmington, Del.

[73] Assignee: E. I. Du Pont de Nemours and Company, Wilmington, Del.

[21] Appl. No.: 707,013

[22] Filed: Feb. 28, 1985

[51] Int. Cl.⁴ .............................................. C08F 14/18
[52] U.S. Cl. .................................................... 526/253
[58] Field of Search ......................................... 526/253

[56] References Cited

U.S. PATENT DOCUMENTS

| | | | |
|---|---|---|---|
| 3,043,815 | 7/1962 | Landrum et al. | 526/253 |
| 3,287,339 | 11/1966 | Sianesi et al. | 260/92.1 |
| 3,576,885 | 4/1971 | Anello et al. | 526/253 |
| 4,123,602 | 10/1978 | Ukihashi et al. | 526/253 |
| 4,381,384 | 4/1983 | Khan | 526/253 |
| 4,424,325 | 1/1984 | Tsunoda et al. | 526/253 |

OTHER PUBLICATIONS

C. G. Overberger et al., Journal of Polymer Science, vol. 62, pp. 23–31 (1962).
C. G. Overberger et al., Journal of Polymer Science, Part A, vol. 7, pp. 217–235 (1969).

*Primary Examiner*—Harry Wong, Jr.

[57] ABSTRACT

The polymers of this invention contain recurring units of the structure

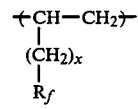

wherein x is a cardinal number of from 2 to 8; and $R_f$ is perfluoroalkyl of 2–10 carbon atoms.

3 Claims, No Drawings

ω-PERFLUOROALKYL-α-OLEFIN POLYMERS

BACKGROUND OF THE INVENTION

High molecular weight α-olefinic polymers having fluorinated alkyl side groups are of interest because the presence of such side groups is expected to impart unique properties such as solvent resistance, selective permeability and the like. Such polymers are always of interest and this invention is directed to such polymers.

SUMMARY OF THE INVENTION

The polymers of this invention contain recurring units of the structure

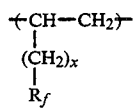

wherein x is a cardinal number of from 2 to 8, preferably 2–4, $R_f$ is perfluoroalkyl of 2–10 carbon atoms.

DESCRIPTION OF THE INVENTION

The polymers of this invention are prepared by polymerizing the corresponding monomer

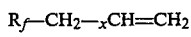

either with itself or with ethylenically unsaturated polymerizable comonomers in the presence of a coordination catalyst system.

The polymers are substantially insoluble in most polar and nonpolar solvents except when the number of carbons in $-CH_2-_x$ exceeds the number in $R_f$.

The catalyst used to make homopolymers of the invention is based on a titanium chloride, $TiCl_4$ supported on a magnesium compound, preferably magnesium chloride. It is described in U.S. Pat. No. 4,461,872. The supported catalyst is activated with a suitable cocatalyst, for example, a trialkylaluminum, which can be further modified by the addition of an organic electron donor. Typical electron donors are either oxygen-containing compounds such as esters, alcohols, phenols, ketones, aldehydes, carboxylic acids, acid amides, anhydrides, and ethers; or nitrogen-containing compounds such as amines, nitriles, and isocyanates. Mixtures of two or more electron donors can be used. The preferred reducing agent is triethylaluminum or triisobutylaluminum, and the preferred electron donor is an ester, for example, methyl p-toluate. The mole ratio of trialkylaluminum to electron donor to titanium halide preferably is about 100:33:1. This ratio is not critical so long as an excess of trialkylaluminum is always present. The amount of solid $TiCl_4$ magnesium compound combination is usually about 0.5–6 g per liter of polymerization mixture. Depending on residence time and temperature, the productivity rate can be from several thousand to several hundred thousand grams of polymer per mole of titanium in the catalyst system.

To make copolymers using ethylenically unsaturated comonomers other catalysts can be used. The polymerization is carried out under a protective atmosphere of inert gas. Generally a solvent is used but is not required. The solvent can be an aliphatic hydrocarbon solvent such as hexane, octane or an cyclohexane or aromatic solvent such as toluene.

Monomer and solvent are first introduced into the reaction vessel at atmospheric pressure. The solution is then heated to the desired temperature. The catalyst is then introduced. Usually the alkyl aluminum cocatalyst is introduced first and the Ti containing "solid" catalyst last. The reactions are then allowed to proceed at atmospheric pressure if an open vessel is used or at super atmospheric pressure if a closed vessel is used.

At the end of the polymerization the catalyst is deactivated by the addition of a small amount of methanol. The reaction mixture, usually in the form of a slurry, is then discharged from the reaction vessel into a container containing a large quantity of methanol acidified by HCl (about 1%). The reaction mixture is stirred from several minutes to several hours in this medium to remove the catalyst. The solid polymer is filtered and may be washed a few more times by the MeOH/HCl solution before drying.

Hydrocarbon α-olefins with ω-perfluoroalkyl-substituents can be homopolymerized or copolymerized to form products with unique combination of structural and functional properties such as: selective permeability, low surface energy, optical clarity and solvent resistance on the polymers.

Copolymerization of the ω-$R_f$-α-olefins with non-fluorinated hydrocarbon α-olefins including ethylene is also possible, producing compositions which are expected to be more soil and stain resistant as compared to the original hydrocarbon polymer, especially in fiber form.

Monomer Preparation

Some monomers used to make the polymers of this invention are prepared as follows:

(1) Preparation of 4-Perfluoroethyl-Butene-1

270 g (1 mole) of $C_2F_5CH_2CH_2I$ and 5 g of AIBN (azobisisobutyronitrile) initiator were charged into a 1 liter pressure vessel. The vessel was cooled to −80° C. and evacuated. It was then warmed to room temperature and pressurized to about 100 psig with ethylene. The vessel was then heated to 80° C., and the ethylene pressure was adjusted to 1000 psig. The reaction mixture was allowed to react at this condition for 8 hours. After the reaction was completed, the vessel was cooled, the pressure released, and the contents discharged. Analysis of the contents by GC and confirmed by GC/mass spectrometry produced the following distribution of peak area:

|  | % |
| --- | --- |
| $C_2F_5(CH_2)_2I$ | 0.6 |
| $C_2F_5(CH_2)_4I$ | 73.8 |
| $C_2F_5(CH_2)_6I$ | 25 |

The components were separated by fractional distillation. The $C_2F_5(CH_2)_4I$ which boiled at about 60° C. at 15 mm pressure, was dehydroiodinated by the methods below:

(a) Via Conversion to

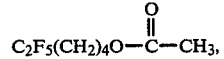

Followed By Pyrolysis.

170 g of the iodide, 400 g of potassium acetate and 6 g of Aliquot 336 (a methyltricapyryl ammonium chloride) were dissolved in 500 ml of water. The mixture was refluxed for one day. The bottom aqueous layer was separated and a solution of 200 g of fresh potassium acetate in 200 ml of $H_2O$ was added to the flask. The mixture was refluxed for 1 more day. The organic layer now contained only $C_2F_5(CH_2)_4OAc$ as determined by a negative halide test. It was dried over anhydrous $MgSO_4$ and then distilled under high vacuum into a cooled receiver. The acetate was then pyrolyzed as follows: The pyrolysis apparatus consisted of a 14"×¾" Pyrex pyrolysis tube with a quartz wool wedge located ⅓ of the way from the top of the tube. The tube was heated to 525°–530° C. The acetate was added to the vertically mounted tube at a rate of about 0.5 ml/min and concurrently a stream of $N_2$ was swept through the tube at a rate of about 5–10 ml/min. The effluent from the tube was collected by a receiver connected to the bottom of the tube and cooled by a dry ice-acetone bath. After all the acetate was added, the tube was purged by $N_2$ for a few minutes. The product in the receiver was removed and fractionally distilled. The fraction distilling at 58°–60° C. was collected. The product, identified as $C_2F_5CH_2CH_2CH=CH_2$ based on $^1H$, $^{13}C$ and $^{19}F$ NMR analysis, was obtained in 30% yield.

(b) Via Dehydroiodination Using Potassium t-Butoxide (t-BuOK)

30.2 g (0.1 mole) of $C_2F_5(CH_2)_4I$, 100 ml of heptane and 15 g of t-BuOK were charged into a 250 ml, 3 neck flask fitted with a mechanical stirrer, a reflux condenser and a thermometer. The mixture was stirred and heated to 60° C. At this stage, a gel-like mixture formed.

The reaction mixture was then heated to the reflux temperature of heptane (90° C.) and maintained at this temperature with vigorous stirring for one hour. Liquid was then distilled out of the reaction flask until about 70 ml was collected. This mixture contained heptane, t-butanol and the product. The liquid mixture was fractionally distilled, and the fraction boiling at 58°–60° C. was collected (yield 52%). The structure of the product was confirmed by $^1H$, $^{13}C$ and $^{19}F$ NMR spectroscopic analysis.

(2) Preparation of 4-Perfluorobutyl-Butene-1 ($C_4F_9(CH_2)_2CH=CH_2$)

(a) 374 g (1 mole) of $C_4F_9(CH_2)_2I$ was interacted with ethylene under reaction conditions resembling those described for the synthesis of $C_2F_5(CH_2)_4I$ in (1) except that the ethylene pressure was 700 psi and the reaction time was six hours. GC analysis indicated only two major components. Eighty-five percent of the peak area corresponded to $C_4F_9(CH_2)_4I$ and about 15% corresponded to $C_4F_9(CH_2)_6I$ plus a small quantity of undefined impurity.

(b) 402 g of $C_4F_9(CH_2)_4I$ (1 mole), 800 ml hexane, and 200 g of potassium t-butoxide were charged to a 2 liter, 3 neck flask fitted with a mechanical stirrer, a reflux condenser and a thermometer. The mixture was heated to reflux for two hours. It was filtered and the solid washed with a small amount of hexane. The liquid mixture was fractionally distilled. The fraction distilling at 100°–102° C. was collected. 160 g of $C_4F_9(CH_2)_2CH=CH_2$ ( 60% yield) was obtained. The structure was verified by NMR spectroscopy.

(3) Preparation of 4-Perfluorohexyl-Butene-1 ($C_6F_{13}(CH_2)_2CH=CH_2$)

500 g of a mixture of $R_f(CH_2)_2I$ in which the $R_f$ is mostly $C_6F_{13}$, but also containing some $C_8F_{17}$ and possibly also some $C_4F_9$, was interacted with ethylene in the same manner as described in (1) except that the ethylene pressure was 900 psi and the reaction time was six hours.

The unpurified product from the above reaction, i.e., the $R_f(CH_2)_4I$, was dehydroiodinated by treating with t-BuOK in the same manner as in (2). The dehydroiodinated mixture was fractionally distilled. 30 g of a fraction distilling at 48°–52° C. at about 4 mm pressure was collected. The structure of the monomer was verified by analysis of its polymer, Example 3.

(4) Preparation of 6-Perfluoroethyl Hexene-1 ($C_2F_5(CH_2)_4CH=CH_2$)

150 g of $C_2F_5(CH_2)_6I$, which is one of the products from a reaction involving $C_2F_5(CH_2)_2I$ with ethylene as described in (1) was dehydroiodinated by t-BuOK in the same manner as in (1) except that all the volatile material was crudely distilled from the reaction mixture and then fractionally distilled. The fraction boiling at 110° C. was collected. The structure was confirmed by $^1H$, $^{19}F$ NMR and by elemental analysis.

(5) Preparation of 6-Perfluorobutyl-Hexene-1 ($C_4F_9(CH_2)_4CH=CH_2$)

374 g of $C_4F_9(CH_2)_2I$ was intereacted with ethylene in the same manner as described in (2), except that the ethylene pressure was increased to 1200 psi and the reaction time was increased to 9–12 hours.

The mixture was distilled under reduced pressure. 150 g of a fraction boiling between 90°–110° C. at about 3 mm pressure was collected.

85 g of the above distillate was interacted with 57 g of t-BuOK in the presence of 287 ml of refluxing hexane for 6 hours. The volatile material was removed from the reaction mixture by vacuum distillation. The distillate was fractionally distilled and the fraction boiling at 49°–50° C. at 15 mm pressure was collected. About 30 g of this product was obtained. The structure of the polymer was verified by spectroscopic and elemental analysis.

EXAMPLES

Example 1

(All Polymerizations Were Carried Out Under Inert Atmosphere)

Preparation of Poly-4-Perfluoroethyl-Butene-1

(a) 30 ml of 4-perfluoroethyl butene-1 was charged into a 50 ml round bottom flask fitted with a reflux condenser a 3 way stop cock and a magnetic stirring bar. 2 m mol. of triethyl aluminum was first added followed by a hexane slurry containing 0.5 g of the solid catalyst $TiCl_4/MgCl_2$. The mixture was heated to reflux with stirring and allowed to react at this condition for 15 mins. A white powdery polymer was produced rapidly. The mixture was cooled and the catalyst deactivated by a small amount of MeOH. It was then poured into a large excess of MeOH, acidified by HCl and stirred to get rid of catalyst residues. The product was isolated by filtration and dried. There was obtained 25 g of polymer, melting at 190° C., which was not soluble in either polar or nonpolar solvents.

(b) Preparation using an electron donor

In this example the polymerization was carried out in a polymerization tube as described in Example 6. 17.4 g of $C_2F_5(CH_2)_2CH=CH_2$, 20 ml of heptane were first charged into the tube followed by 3 m mol. of $Et_3Al$, 1 m mol. of the electron donor, methyl p-toluate, and 0.2 g of the solid catalyst. The tube was heated to 60° C. After several hours only a small amount of polymer was formed. The amount of catalyst was doubled and the polymerization allowed to proceed for another 12 hours. 10.5 g of polymer was isolated which could be pressed into a clear, flexible, tough film. ¼" strips of the film were died out and tested for stress-strain properties by ASTM method D412 at room temperature. The results are shown in Table I. The film can be heat oriented to further improve the tensile strength.

(c) Preparation using a Different catalyst

The polymerization procedure and apparatus are the same as in Example 1 except that 15 g of the monomer and 25 ml of heptane was used and the catalyst consists only of 3 m mol. of triisobutyl aluminum and 0.2 g of the solid catalyst. The reaction was allowed to take place at room temperature for a short time (10-20 mins) then heated to 50° C. and continued for about 2 hrs. Eleven grams of the polymer were obtained.

Example 2

Preparation of Poly-4-perfluorobutylbutene-1 (Poly-$C_4F_9(CH_2)_2CH=CH_2$)

(a) The reaction was carried out in a 3 neck, 100 ml round bottom flask fitted with a mechanical stirrer and a thermometer. 20 ml of heptane and 20 ml of $C_4F_9(CH_2)_2CH=CH_2$ was first added. While stirring 6 m mole of $Et_3Al$, 1 m mole of methyl p-toluate and 0.6 g of the solid catalyst was added. It was heated to 70° C. and the reaction was allowed to proceed for 2 days. 14 g of a flexible polymer was obtained which was washed clean of catalyst by hot MeOH/HCl. Elemental analysis indicated that it is a poly-$C_4F_9(CH_2)_2CH=CH_2$ containing about 1 weight % of ethylene as comonomer in the polymer. The ethylene came from the decomposition of the cocatalyst $Et_3Al$: $(CH_3CH_2)_3Al \rightarrow C_2H_4 + HAl(CH_3CH_2)_2$.

This small amount of ethylene comonomer is not expected to change the polymer property, see stress-strain data, Table I. The highly solvent resistant polymer can be pressed into transparent flexible film which is also orientable to improve strength. It has a melting range of about 80°-90° C.

(b) The reaction was carried out by charging 20 ml of heptane and then 25 ml of $C_4F_9(CH_2)_2CH=CH_2$ into the flask. It was then heated to 50° C. and 3 m mol. of triisobutyl aluminum followed by 0.2 g of the solid $TiCl_4/MgCl_2$ catalyst were added. The reaction was allowed to go on for about 4 hours. The polymer obtained (14 g) was washed with hot MeOH/HCl to remove catalyst residues. Elemental analysis indicated only pure homopolymer of $C_4F_9(CH_2)_2CH=CH_2$. The polymer is insoluble in hydrocarbon, fluorocarbon and polar solvents.

Its properties are about the same as the sample prepared in (a) (Table I).

TABLE I

| Examples | Stress-strain properties | | | | |
| --- | --- | --- | --- | --- | --- |
| | I-b | Ib-O[1] | 2a | 2a-O[1] | 2b |
| Modulus at 100% elongation (MPa) | — | — | 3.4 | — | 3.4 |
| Tensile Strength at Break (MPa) | 13.8 | 34.5 | 8.3[2] | 23 | 10.3[2] |
| Percent elongation at Break | 60 | 20 | 290[2] | 50 | 270[2] |

[1]Oriented sample: heated by an infrared lamp, then stretched to 3 times the original length, held for 2-3 minutes and allowed to cool to room temperature
[2]Maximum result was not achieved because the sample tended to slip from the clamps of the instrument during testing.

Example 3

Preparation of Poly-4-Perfluorohexyl Butene-1

The polymerization was carried out in the same manner as in Example 1 except that 10 ml of the monomer 4-perfluorohexyl butene-1, 20 ml of heptane and 2 m mol. of triisobutyl aluminum were used. The polymerization took place at 60° C. overnight. 7 g of polymer was obtained. Elemental analysis indicated that the polymer contained almost all $C_6F_{13}(CH_2)_2CH=CH_2$ homopolymer which is soluble only in fluorocarbon solvents such as "Freon" 113.

Example 4

Preparation of Poly-6-Perfluoroethyl-Hexene-1

The procedure described in Example 1 was repeated except for the following:
Monomer=6-perfluoroethyl hexene-1 (10.5 ml)
Cocatalyst=triisobutyl aluminum (2 M mol.)
Temp.=22° C.
Time=2 hours.
10 g of rubbery polymer with Tg=about −40° C. was obtained. The polymer is not soluble in either polar or nonpolar solvents but is swollen by these solvents.

Example 5

Preparation of Poly-6-Perfluorobutyl-Hexene-1

15 ml of 6-perfluorobutyl-hexene-1 and 20 ml of heptane were charged into a 100 ml, round bottom flask as in Example 2a, and heated to 60° C. 2 m mol. of triisobutyl aluminum was added followed by 10 ml of a hexane slurry containing 0.2 g of the solid $TiCl_4/MgCl_2$ catalyst. Reaction took place immediately and was stopped by addition of MeOH after 30 mins. The polymerization mixture was dumped into a large excess of MeOH acidified by HCl and stirred for 1 hour. 12 g of polymer was isolated. The polymer is a flexible, oil resistant plastic.

Example 6

Preparation of Copolymers from 5,5,5-trifluoropentene ($CF_3(CH_2)_2CH=CH_2$) AND $C_4F_9(CH_2)_2CH=CH_2$ To a glass polymerization tube fitted with a 3 way stopcock and containing a magnetic stirring bar was added 35 ml of heptane, 15 g $CF_3(CH_2)_2CH=CH_2$ and 6.7 g $C_4F_9(CH_2)_2CH=CH_2$. The tube was heated to 40° C. With stirring 2 m mol. of triethyl aluminum was added followed by 0.2 g of the solid catalyst $TiCl_4/MgCl_2$. The stopcock of the tube was closed right after this last addition. Polymerization took place immediately. The reaction was complete after 4 hours. The polymerization tube was cooled to room temperature. The stopcock was opened and about 0.5 to 1 ml of methanol was added to deactivate the catalyst. The polymer mixture was then discharged into a large excess of methanolic HCl and stirred for several hours to remove the catalyst residues. The polymer was isolated by filtration. The yield was 17 g. Elemental analysis indicated a $CF_3(CH_2)_2CH=CH_2/C_4F_9(CH_2)_2CH=CH_2$ ratio of about 41/9 by weight. The copolymer is transparent and very flexible.

Examples 7-9

Copolymerization of $R_f(CH_2)_2CH=CH_2$

These copolymerizations were carried out in about the same manner as described in Example 6. The results are tabulated in the table below.

| Examples | Monomers ($R_f$) | g | Yield (g) | a/b in Polymer |
|---|---|---|---|---|
| 7 | (a) $CF_3$ | 10 | 8.5 | 6/1 |
|   | (b) $C_2F_5$ | 2.2 | | |
| 8 | (a) $CF_3$ | 2 | 23 | 1/10 |
|   | (b) $C_2F_5$ | 22 | | |
| 9 | (a) $C_2F_5$ | 18 | 21 | 31/19 |
|   | (b) $C_4F_9$ | 12 | | |

Example 10

Copolymerization of Ethylene With 4-Perfluorobutyl Butene-1

10 ml of $C_4F_9(CH_2)_2CH=CH_2$ and 10 ml of hexane were put into a polymerization tube containing a magnetic stirrer. A slow stream of ethylene was bubbling through the solution. 1 m mol. of $Et_3Al$ and 0.2 m mol. of $TiCl_4$ were added. The reaction temperature rose from 20° C. to 30° C. and was kept there for about 45 minutes with continued slow bubbling of ethylene. The reaction was stopped by addition of a small amount of methanol, the polymer slurry was dumped into a methanolic HCl solution, washed with methanol and dried. 4 g of polymer was isolated. Elemental analysis indicated that it contained 1.83% F or about 3% incorporation of $C_4F_9(CH_2)_2CH=CH_2$.

Example 11

Copolymerization of Propylene With 4-Perfluoroethyl-Butene-1

11 g of $C_2F_5(CH_2)_2CH=CH_2$ was charged into a polymerization tube as described in Example 6. The tube was exposed to a constant atmosphere of propylene at atmospheric pressure. While the liquid phase was being stirred, the following catalyst components were added:

1 m mol. of triethyl aluminum
0.02 g of the solid $TiCl_4/MgCl_2$ catalyst

After about an hour of reaction several grams of the copolymer were isolated. The copolymer contained 5.8% of F or about 14% incorporation of $C_2F_5(CH_2)_2CH=CH_2$.

Example 12

Selective Gaseous Permeability Measurements of Poly $R_f(CH_2)_2CH=CH_2$ Film

The unique structure of the polymers of this invention suggests possible applications as selective permeable membranes for separation of gaseous mixtures. Fluorocarbon polymers such as Teflon ® have good selective permeability for gaseous mixtures such as $H_2/CH_4$ or $CH_4/CO_2$ but low permeability. On the other hand hydrocarbon polymers such as polybutadiene or natural rubber have high permeability but poor selectivity. The poly $\omega$-$R_f$-$\alpha$-olefin which contain a hydrocarbon molecular "core" and a fluorocarbon molecular "skin" appeared to have both high selectivity and high permeability.

Selective permeability determinations are carried out as follows:

Polymers to be tested are compression molded into a thin film, about 15 mil thick. A 2" diameter disc of the film is died out and then mounted inside a test cell. The test cell (which can be purchased from Millipore Corporation) consists of two chambers separated by the polymer film to be tested. Gases A and B at a desired pressure are metered separately by flow control devices, (e.g. Brooks Mass Control 5880 series) into a mixing cell. Part of the mixed gases flow into the inlet chamber of the test cell. The major portion is diverted away from the cell through a "T" connection located near the inlet to the test cell. The gas mixture flows continuously at 125 ml/min through tube "T" passing a pressure regulator and into a GC where the ratio of A & B is monitored. The regulator controls the pressure of the gas mixture inside the chamber I, of the test cell. The gas mixture diffused through the membrane into the chamber E and exit the cell. The exit gases a and b are sweep by a constant flow of He gas (10 ml/min) into another GC where the composition of a, b is analyzed. The selectivity of the membrane towards a specific gas is calculated via the ratio (a/b)/(A/B). The amount of the gases flow through the membrane at a given time is measured directly. The permeability of the membrane with respect to a given gas is calculated by established method (Polymer Hand Book, 2nd Ed. (Brandrup and Immergut), P. III - 236).

$$P = \text{permeability coefficient} = \frac{V\text{cm}^3(STP) \times D(\text{cm})}{A(\text{cm}^2) \times T(\text{sec}) \times P(\text{cm-Hg})}$$

where
V = volume of permeant
D = membrane thickness
A = membrane area
T = time
P = pressure drop across the membrane The results of the selective permeability measurement of the mixed gases $CO_2$ and $CH_4$ is shown in Table II.

TABLE II

| $R_f(CH_2)_2CH=CH_2$[1] Polymer | Vol. % Feed $CO_2/CH_4$ | Pressure (psi) | $\underline{P}$, $CO_2$[2] | $CO_2$ Selectivity $(CO_2/CH_4)$ product $(CO_2/CH_4)$ Feed |
|---|---|---|---|---|
| $R_f = C_2F_5$ | 80/20 | 120 | $3.4 \times 10^{-8}$ | 15 |
|  | 60/40 | 120 | $3.0 \times 10^{-8}$ | 15 |
|  | 40/60 | 120 | $3.1 \times 10^{-8}$ | 15 |

TABLE II-continued

| $R_f(CH_2)_2CH=CH_2$[1] Polymer | Vol. % Feed $CO_2/CH_4$ | Pressure (psi) | $\underline{P}$, $CO_2$[2] | $CO_2$ Selectivity $\dfrac{(CO_2/CH_4) \text{ product}}{(CO_2/CH_4) \text{ Feed}}$ |
|---|---|---|---|---|
| | 20/80 | 120 | $2.8 \times 10^{-8}$ | 14 |
| $R_f = C_4F_9$ | 80/20 | 125 | $7.7 \times 10^{-8}$ | 9 |
| | 60/40 | 125 | $6.9 \times 10^{-8}$ | 9 |
| | 40/60 | 125 | $5.6 \times 10^{-8}$ | 9 |
| | 20/80 | 125 | $5.6 \times 10^{-8}$ | 8 |
| Natural Rubber[3] | — | — | $5 \times 10^{-8}$ | 5 |
| Teflon[3] | — | — | $1.2 \times 10^{-9}$ | 10 |

[1] Film thickness 0.04 cm

[2] $\underline{P}$ = permeability coefficient = $\dfrac{cm^3 \text{ (STP)} \times cm}{cm^2 \times sec \times (cm\text{-}Hg)}$

[3] From Polymer Hand Book

I claim:

1. A polymer containing recurring units of the structure

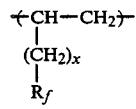

wherein x is a cardinal number of from 2 to 8, and $R_f$ is perfluoroalkyl of 2-10 carbon atoms.

2. The polymer of claim 1 wherein the polymer is a homopolymer.

3. The polymer of claim 1 wherein the polymer is a copolymer which additionally contains at least one other ethylenically unsaturated copolymerizable comonomer.

* * * * *